(12) United States Patent
Hanson

(10) Patent No.: US 9,920,693 B2
(45) Date of Patent: Mar. 20, 2018

(54) HOLLOW-WALL HEAT SHIELD FOR FUEL INJECTOR COMPONENT

(71) Applicant: United Technologies Corporation, Hartford, CT (US)

(72) Inventor: Russell B. Hanson, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/769,386

(22) PCT Filed: Mar. 13, 2014

(86) PCT No.: PCT/US2014/025337
§ 371 (c)(1),
(2) Date: Aug. 20, 2015

(87) PCT Pub. No.: WO2014/189602
PCT Pub. Date: Nov. 27, 2014

(65) Prior Publication Data
US 2016/0003156 A1    Jan. 7, 2016

Related U.S. Application Data

(60) Provisional application No. 61/784,343, filed on Mar. 14, 2013.

(51) Int. Cl.
*F23R 3/04* (2006.01)
*F02C 7/22* (2006.01)
(Continued)

(52) U.S. Cl.
CPC .............. *F02C 7/222* (2013.01); *F02C 7/24* (2013.01); *F23R 3/14* (2013.01); *F23R 3/283* (2013.01);
(Continued)

(58) Field of Classification Search
CPC .......... F02C 7/222; F02C 7/224; F23R 3/293; F23R 3/14; F23D 11/1107; F23D 2900/11101
(Continued)

(56) References Cited

U.S. PATENT DOCUMENTS 4,831,700 A    5/1989  Halvorsen et al.
4,854,127 A    8/1989  Vinson et al.
(Continued)

FOREIGN PATENT DOCUMENTS

| GB | 2476253 A | 6/2011 |
|---|---|---|
| WO | WO2008071902 A1 | 6/2008 |
| WO | WO2009126534 A1 | 10/2009 |

OTHER PUBLICATIONS

International Search Authority, PCT Notification of Transmittal of the International Search Report and the Written Opinion, dated Dec. 23, 2014, 11 pages.

(Continued)

*Primary Examiner* — Alexander Valvis
(74) *Attorney, Agent, or Firm* — Kinney & Lange, P.A.

(57) ABSTRACT

A fuel injector component includes a body, an elongate void and a plurality of bores. The body has a first surface and a second surface. The elongate void is enclosed by the body and is integrally formed between portions of the body defining the first surface and the second surface. The plurality of bores extends into the second surface to intersect the elongate void. A process for making a fuel injector component includes building an injector component body having a void and a plurality of ports connected to the void using an additive manufacturing process that utilizes a powdered building material, and removing residual powdered building material from void through the plurality of ports.

18 Claims, 9 Drawing Sheets

(51) Int. Cl.
*F02C 7/24* (2006.01)
*F23R 3/14* (2006.01)
*F23R 3/50* (2006.01)
*F23R 3/28* (2006.01)
*B33Y 10/00* (2015.01)
*B33Y 80/00* (2015.01)

(52) U.S. Cl.
CPC ................ *F23R 3/286* (2013.01); *F23R 3/50* (2013.01); *B33Y 10/00* (2014.12); *B33Y 80/00* (2014.12); *F05D 2230/22* (2013.01); *F05D 2230/53* (2013.01); *F23R 2900/00018* (2013.01)

(58) Field of Classification Search
USPC ............................ 60/737, 740, 748; 239/408
See application file for complete search history.

(56) References Cited

U.S. PATENT DOCUMENTS

| | | | |
|---|---|---|---|
| 5,966,937 A | 10/1999 | Graves | |
| 6,715,292 B1 | 4/2004 | Hoke | |
| 7,654,091 B2 * | 2/2010 | Al-Roub | F23R 3/283 60/748 |
| 8,171,734 B2 | 5/2012 | McMasters et al. | |
| 8,181,891 B2 | 5/2012 | Ziminsky et al. | |
| 8,186,163 B2 | 5/2012 | Hernandez et al. | |
| 8,661,826 B2 * | 3/2014 | Garry | C23C 4/02 60/752 |
| 2004/0050070 A1 | 3/2004 | Sprouse et al. | |
| 2005/0081527 A1 * | 4/2005 | Howell | F23L 15/04 60/748 |
| 2005/0229600 A1 | 10/2005 | Kastrup et al. | |
| 2006/0059914 A1 | 3/2006 | Mantchenlov et al. | |
| 2007/0193272 A1 | 8/2007 | Hebert et al. | |
| 2009/0255257 A1 | 10/2009 | McMasters et al. | |
| 2009/0258168 A1 | 10/2009 | Barcock et al. | |
| 2010/0050644 A1 * | 3/2010 | Pidcock | F23D 11/107 60/737 |
| 2011/0259976 A1 | 10/2011 | Tyler et al. | |
| 2012/0186259 A1 | 7/2012 | Hoke | |

OTHER PUBLICATIONS

Extended European Search Report, European Application No. 14801018.4, dated Feb. 8, 2016, 8 pages.

* cited by examiner

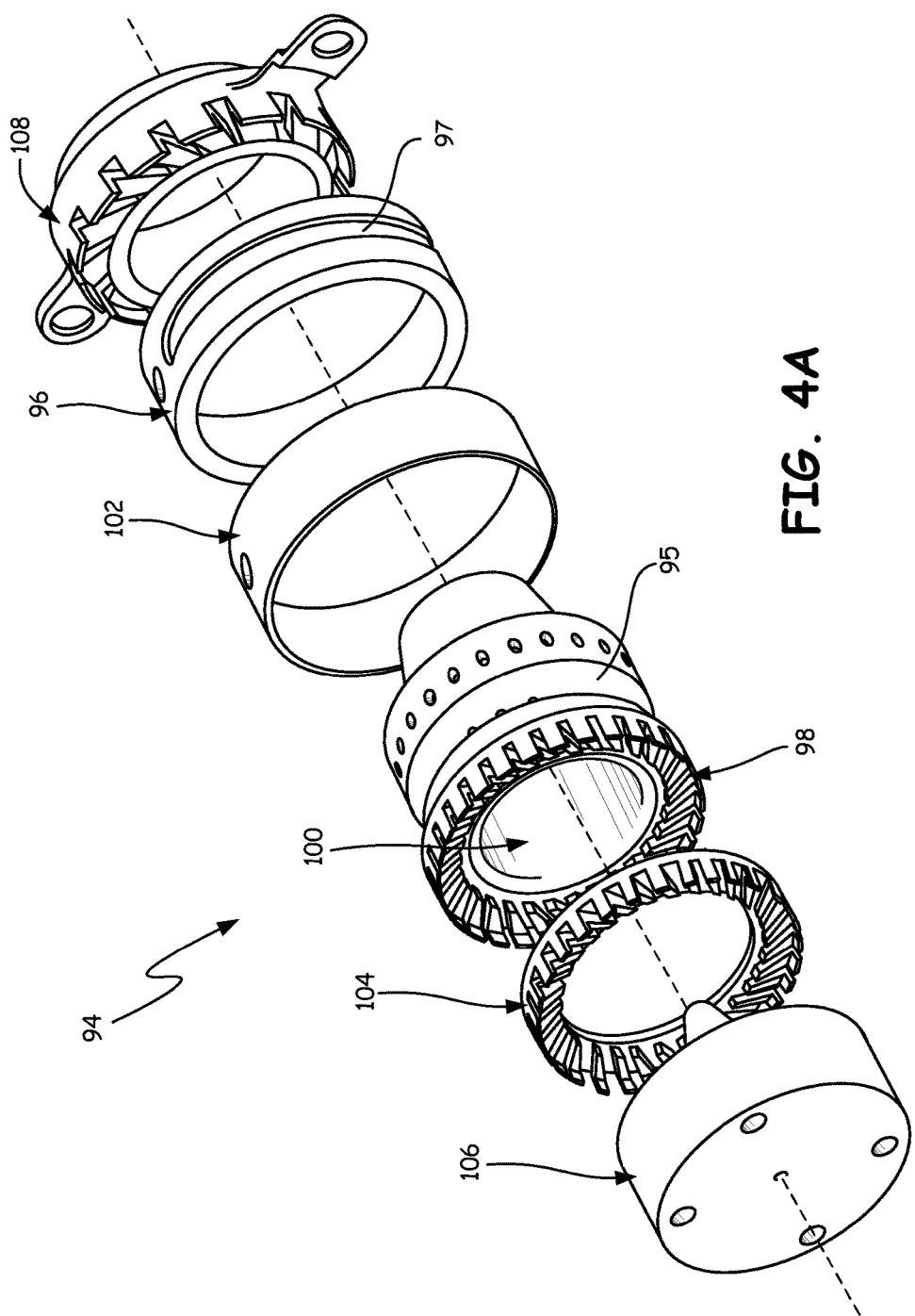

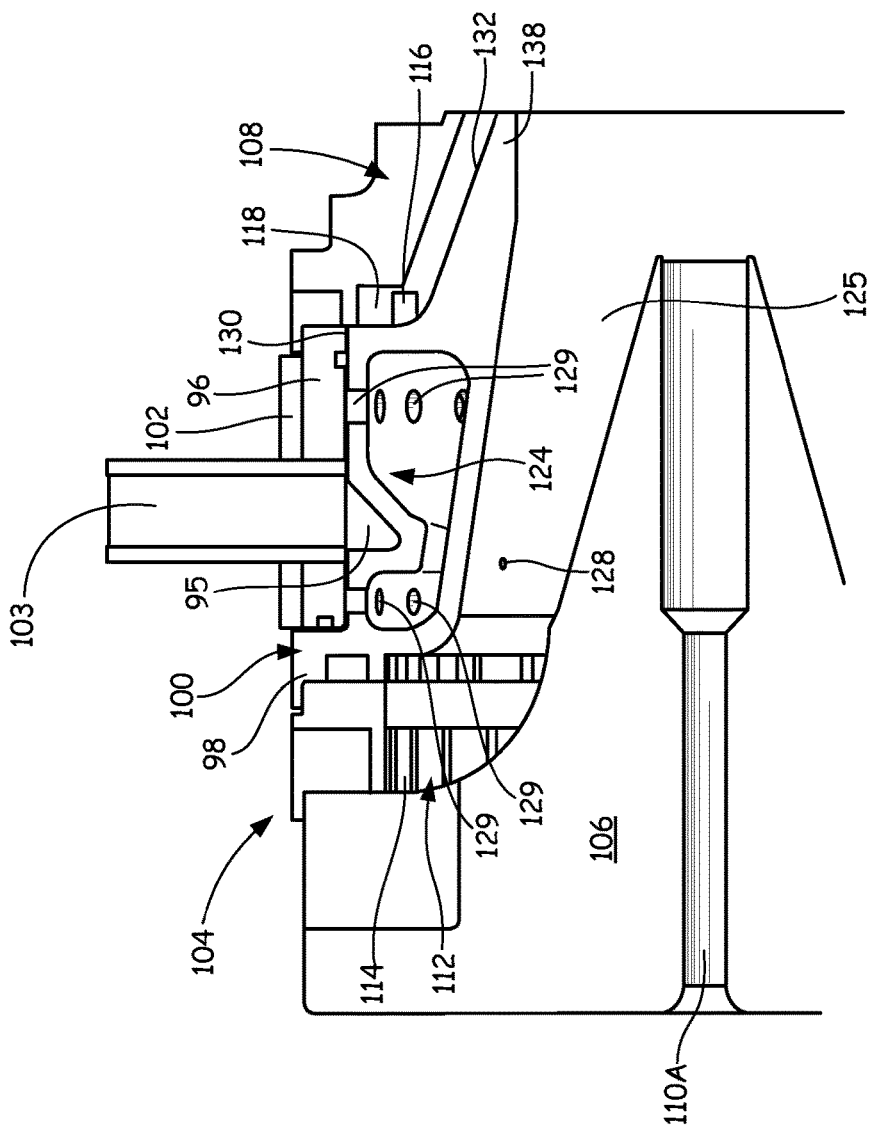

HOLLOW-WALL HEAT SHIELD FOR FUEL INJECTOR COMPONENT

STATEMENT OF GOVERNMENT INTEREST

The U.S. Government has a paid-up license in this invention and the right in limited circumstances to require the patent owner to license others on reasonable terms as provided for by the terms of Contract No. NNC10CA11C awarded by NASA.

BACKGROUND

The present disclosure relates generally to gas turbine engines and more particularly to fuel injectors for use in combustors.

Gas turbine engines operate by passing a volume of high energy gases through a plurality of stages of vanes and blades, each having an airfoil, in order to drive turbines to produce rotational shaft power. The shaft power is used to drive a compressor to provide compressed air to a combustion process to generate the high energy gases. Additionally, the shaft power may be used to drive a fan or propeller to produce thrust for aircraft, to drive an electrical generator for powering aircraft systems, or to drive an electrical power plant in industrial gas turbine. In order to produce gases having sufficient energy to drive the turbines, it is necessary to combust the air at elevated temperatures and to compress the air to elevated pressures, which again increases the temperature. The combustion process involves injecting a stream of fuel into a high speed flow of compressed air within a combustion chamber. The fuel is typically finely atomized and swirled to ensure a high degree of mixing with the compressed air to produce a high fuel burn rate, such as is disclosed in U.S. Pat. No. 5,966,937 to Graves, which is assigned to United Technologies Corporation.

In order to atomize the fuel in the fuel injector, it is necessary to flow air through intricate passages and orifices within the injector to become entrained with the fuel. Flow of air over surfaces of the injector results in frictional heating of the injector. Heat from the air flow is passed to the fuel by conduction through the injector. As such, it is beneficial to insulate un-atomized fuel within the injector from the surfaces exposed to airflow. One method of insulating the fuel is to provide dead-air space within the injector, such as described in U.S. Pat. No. 6,715,292 to Hoke, which is assigned to United Technologies Corporation. Such spaces, however, are typically formed by interaction of two adjacent pieces of the injector, which requires precise machining of multiple components, careful matching of the components and sealing of the adjacent components. Such steps add significant time and expense to the manufacturing process. Further, the joints between the adjacent components reduce the efficiency of the insulation space. There is, therefore, a need for fuel injectors having improved insulating characteristics.

SUMMARY

A fuel injector component comprises a body, an elongate void and a plurality of bores. The body has a first surface and a second surface. The elongate void is enclosed by the body and is integrally formed between portions of the body defining the first surface and the second surface. The bores extend into the second surface to intersect the elongate void.

A process for making a fuel injector component for use in a gas turbine engine comprises building an injector component body using an additive manufacturing process that utilizes a powdered building material, and removing residual powdered building material from the injector component body. The injector component body comprises a first surface configured to be in thermal communication with a fuel flow, a second surface configured to be in thermal communication with an air flow, a void substantially enclosed by the body, the void being integrally formed by portions of the body defining the first surface and the second surface, and a plurality of ports extending into the second surface to intersect the void. Residual powdered building material is removed from the void through the plurality of ports.

BRIEF DESCRIPTION OF THE DRAWINGS

FIG. 4A is an exploded view of a fuel injector centerbody having an integral fuel manifold and radial air swirler that utilizes hollow-wall heat shielding.

FIG. 5A is a partial cross-sectional view of the fuel injector centerbody of FIG. 4B showing a hollow-wall void between the fuel manifold and an air flow surface.

DETAILED DESCRIPTION

Figure 1:
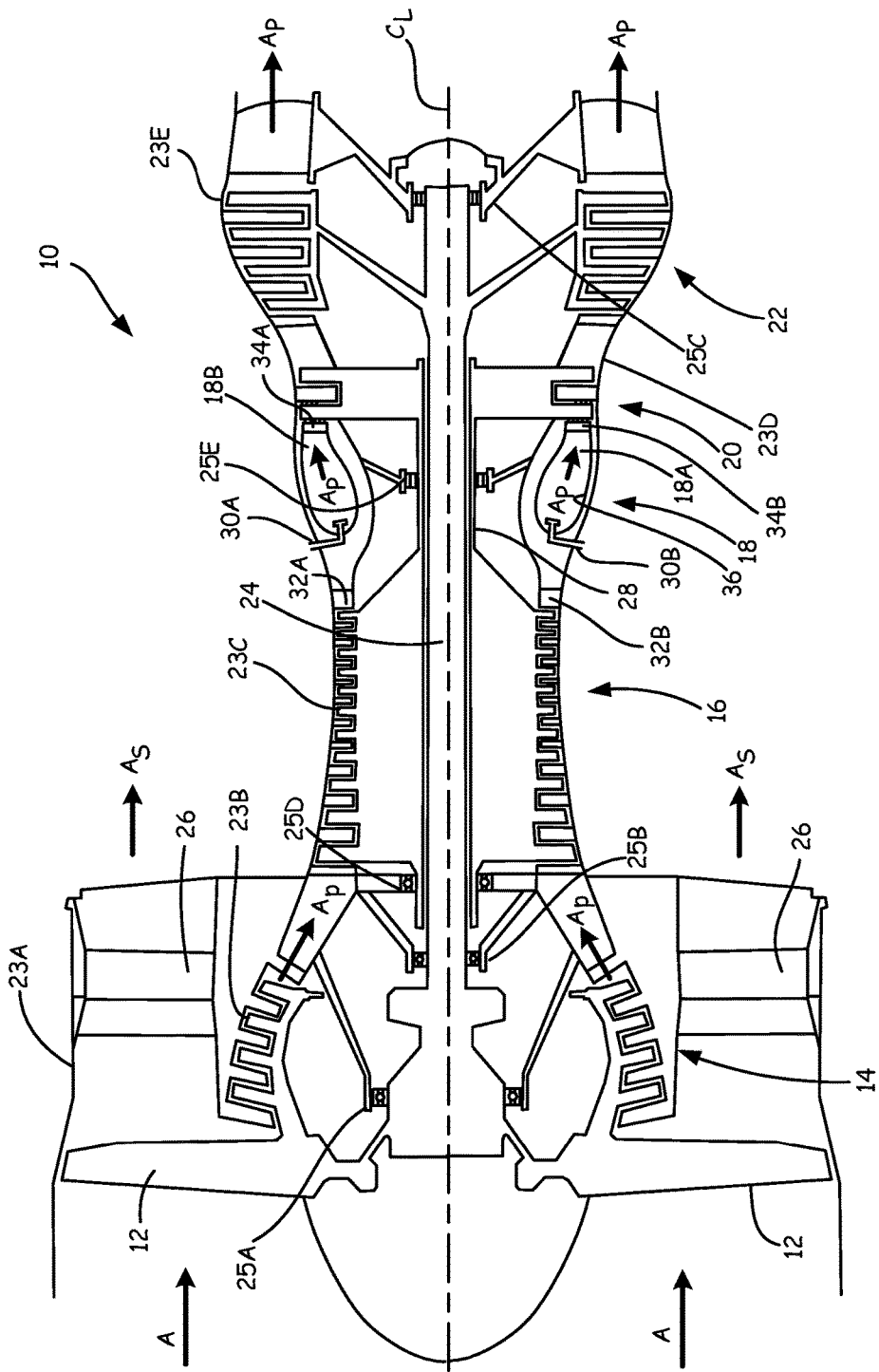
FIG. 1 is a schematic diagram of a dual-spool, low-bypass ratio turbofan engine having a combustor with a hollow-wall fuel injector of the present invention.

FIG. 1 shows gas turbine engine 10, in which hollow-wall heat shielding of the present invention is used. Gas turbine engine 10 comprises a dual-spool turbofan engine having fan 12, low pressure compressor (LPC) 14, high pressure compressor (HPC) 16, combustor section 18, high pressure turbine (HPT) 20 and low pressure turbine (LPT) 22, which are each concentrically disposed around longitudinal engine centerline CL. Although depicted as a turbofan gas turbine engine in the disclosed non-limiting embodiment, it should be understood that the concepts described herein are not limited to use with turbofans as the teachings may be applied to other types of engines. Fan 12 is enclosed at its outer diameter within fan case 23A. Likewise, the other engine components are correspondingly enclosed at their outer diameters within various engine casings, including LPC case 23B, HPC case 23C, HPT case 23D and LPT case 23E such that an air flow path is formed around centerline CL.

Inlet air A enters engine 10 and it is divided into streams of primary air $A_P$ and secondary air $A_S$ after it passes through fan 12. Fan 12 is rotated by low pressure turbine 22 through shaft 24 to accelerate secondary air $A_S$ (also known as bypass air) through exit guide vanes 26, thereby producing a major portion of the thrust output of engine 10. Shaft 24 is supported within engine 10 at ball bearing 25A, roller bearing 25B and roller bearing 25C. Primary air $A_P$ (also known as gas path air) is directed first into low pressure compressor (LPC) 14 and then into high pressure compressor (HPC) 16. LPC 14 and HPC 16 work together to incrementally step up the pressure of primary air $A_P$. HPC 16 is rotated by HPT 20 through shaft 28 to provide compressed air to combustor section 18. Shaft 28 is supported within engine 10 at ball bearing 25D and roller bearing 25E. The compressed air is delivered to combustors 18A and 18B, along with fuel through injectors 30A and 30B, such that a combustion process can be carried out to produce the high energy gases necessary to turn turbines 20 and 22. Primary air $A_P$ continues through gas turbine engine 10 and it is typically passed through an exhaust nozzle to further produce thrust.

Combustor section 18 comprises injectors 30A and 30B, inlet guide vanes 32A and 32B, exit guide vanes 34A and 34B and combustion chamber 36. Guide vanes 32A, 32B, 34A and 34B direct compressed air from HPC 16 through combustion chamber 36 and into HPT 20. In many configurations, fuel injectors 30A and 30B include swirl vanes, either radial or axial, that produce a vortex of swirling air around the flow of fuel being dispensed from fuel injectors 30A and 30B. The swirling of the air along with fine atomization of the fuel produced by orifices in injectors 30A and 30B results in a highly homogenous mixture of fuel and air combustion products. As such, a highly efficient combustion process can be carried out with the use of igniters, as is known in the art. As will be discussed with reference to FIG. 2, the airflow through injectors 30A and 30B produces frictional heating of surfaces within the injector. Injectors and swirlers of the present invention include hollow-wall heat shielding to prevent heating of fuel within the injectors from the flow of air.

Figure 2:
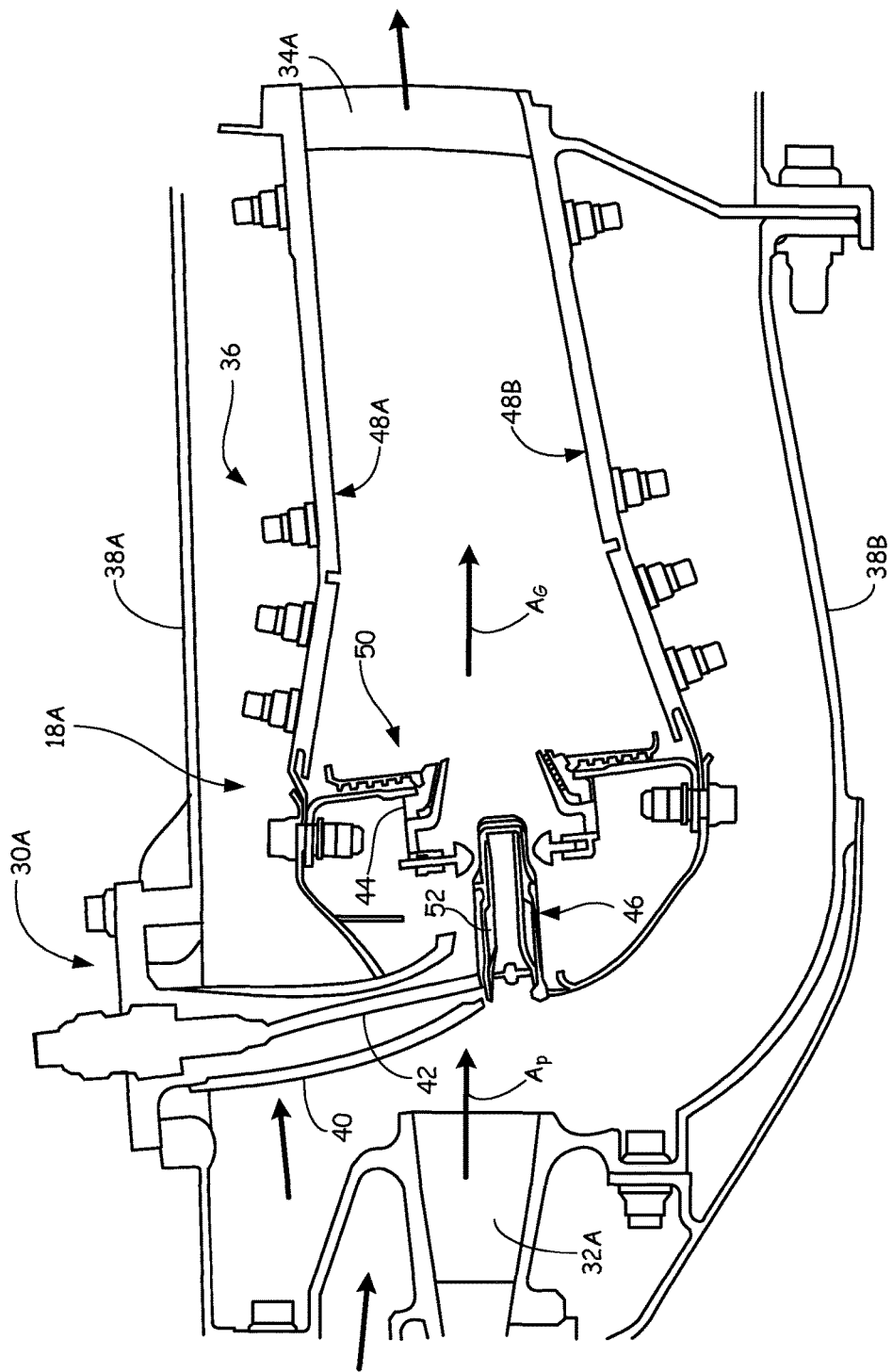
FIG. 2 is a cross-sectional view of the combustor of FIG. 1 showing a fuel injector having hollow-wall heat shielding.

FIG. 2 is a cross-sectional view of combustor 18A of FIG. 1 showing fuel injector 30A having hollow-wall heat shielding. Combustor 18A includes inlet guide vane 32A, exit guide vane 34A, combustion chamber 36 and cases 38A and 38B. Fuel injector 30A includes stem 40, fuel line 42, swirler 44 and fuel nozzle 46. Combustion chamber 36 includes outer wall 48A and inner wall 48B and bulkhead 50.

Compressed primary air $A_P$ from HPC 16 (FIG. 1) flows past inlet guide vane 32A towards combustion chamber 36 and fuel injector 30A. Stem 40 is connected to outer case 38A and provides an aerodynamic housing for coupling fuel line 42 with injector 30A. Fuel nozzle 46 of injector 30A is coupled to stem 40 and extends into swirler 44, which is mounted within bulkhead 50. Outer and inner walls 48A and 48B of combustion chamber 36 extend from bulkhead 50 to outlet guide vane 34B and define an annular combustion chamber. Bulkhead 50 and walls 48A and 48B include heat shields as are known in the art. Primary air $A_P$ flows along the exterior of fuel nozzle 46 and through openings in swirler 44 into combustion chamber 36. Fuel from fuel line 42 flows into fuel nozzle 46, which includes orifices for atomizing the liquid fuel, similar to those shown in FIGS. 3 and 5B. An igniter (not shown) extends through outer case 38A and an opening in outer wall 48A to the interior of combustion chamber 36. The igniter provides an ignition source for burning the liquid fuel within compressed primary air $A_P$. The high energy gases $A_G$ resulting from the combustion process flow past exit guide vane 34B and into HPT 20 (FIG. 1) for driving gas turbine engine 10.

Due to the proximity of fuel injector 30A to the combustion process that is executed within combustion chamber 36, the fuel flowing through fuel line 42 and fuel nozzle 46 is heated. Furthermore, the flow of compressed primary air $A_P$ over stem 40, fuel nozzle 46 and swirler 44 produces frictional heating of the various fuel injector components. These combined heating mechanisms on the fuel can lead to premature coking of the fuel within fuel line 42 and fuel nozzle 46. It is, therefore, sometimes desirable to provide heat shielding in various fuel injector components, such as nozzle 46 or swirler 44, to shield fuel within the components from heating, particularly that generated by friction of the flow of primary air $A_P$ over the component. The present invention utilizes additive manufacturing processes, such as direct metal laser sintering (DMLS) or electron beam melting (EBM) of powdered metal, to produce a monolithic fuel injector component containing an integral void, or dead-air space. The resulting hollow wall provides heat shielding that inhibits communication of heat from the flow of compressed primary air $A_P$ to the fuel.

The embodiment of fuel injector 30A in FIG. 2 utilizes stem 40 and radial swirler 44, which are separate components from fuel nozzle 46. However, in other embodiments, a swirler may be integrated with the fuel nozzle. For the depicted embodiment, fuel nozzle 46 includes void 52 that shields flow of fuel within nozzle 46 from flow of primary air $A_P$ around the exterior of nozzle 46. In other embodiments, the void may be located in swirler 44. The details of the present invention are better shown in FIG. 3, which shows an embodiment of fuel injector 30A comprising a fuel nozzle coupled to an axial swirler.

Figure 3:
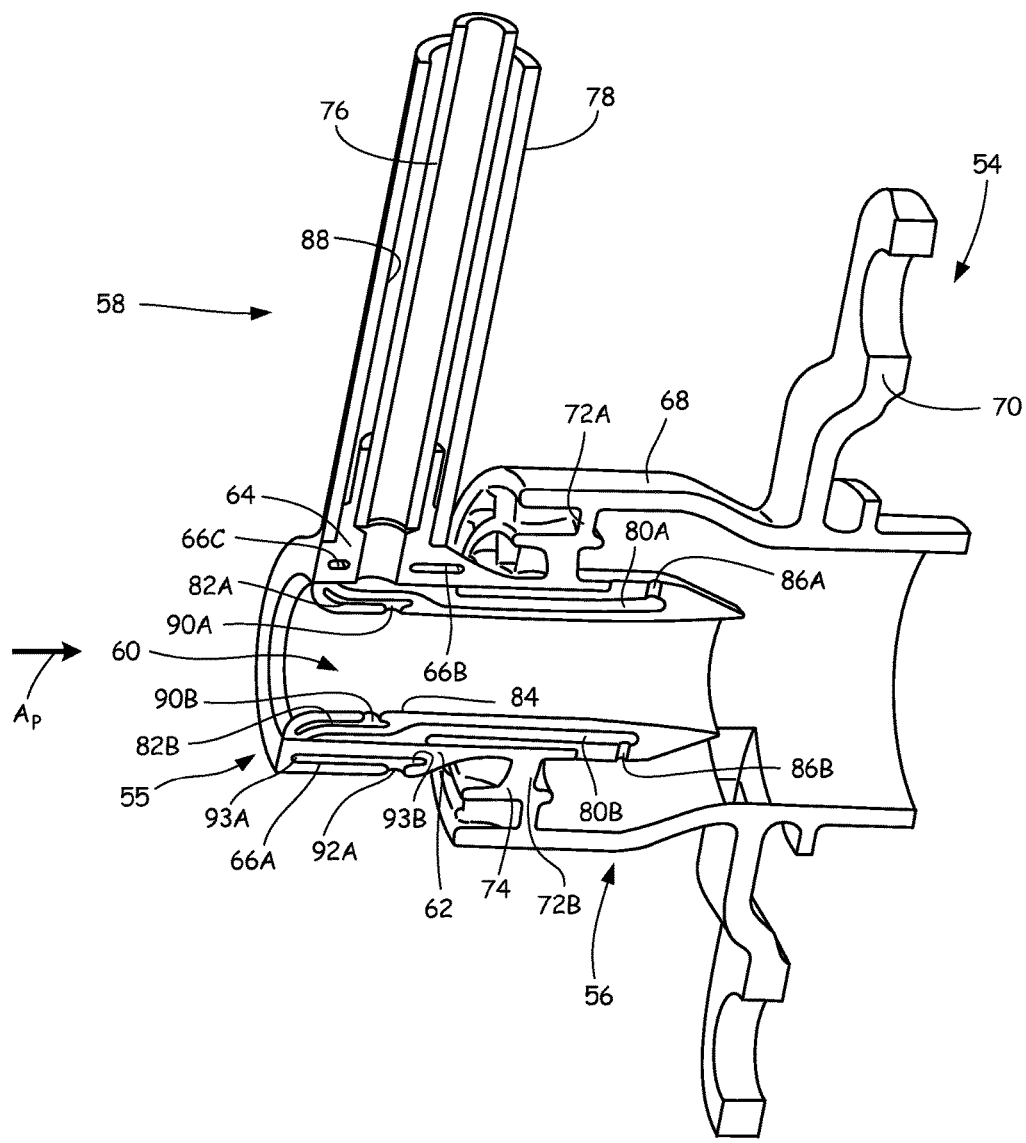
FIG. 3 is a perspective view of a fuel injector having an axial air swirler and fuel nozzle utilizing hollow-wall heat shielding.

FIG. 3 is a perspective view of fuel injector 54 having fuel nozzle 55 and axial air swirler 56 utilizing hollow-wall heat shielding. Fuel link 58 couples to centerbody 60 of fuel nozzle 55 while passing through annular body 62 of axial air swirler 56. Centerbody 60 is inserted into annular body 62 of axial air swirler 56. Annular body 62 includes fuel stem 64 and voids 66A, 66B and 66C. Swirler 56 includes hood 68, coupling flange 70, vanes 72A and 72B and ring 74. Fuel link 58 includes fuel line 76 and shield 78. Centerbody 60 includes fuel passages 80A and 80B, voids 82A and 82B and air passage surface 84. Fuel passages 80A and 80B terminate in orifices 86A and 86B, respectively.

Fuel line 76 extends into fuel stem 64 of fuel nozzle 55 and is fluidly coupled to fuel passages 80A and 80B, which form an annular ring around centerbody 60. Shield 78 surrounds fuel line 76 to form air space 88 that provides a heat insulating space for fuel line 76 from flow of primary air $A_P$ around shield 78. Shield 78 surrounds fuel stem 64 to form a joint or coupling. Annular body 62 extends perpendicularly from fuel stem 64 and provides a platform for holding centerbody 60. Vanes 72B extend radially outward from annular body 62. Ring 74 surrounds vanes 72B, and vanes 72A extend radially outward from ring 74 and join to hood 68 of air swirler 56. Hood 68 extends generally axially from vanes 72A and provides a body for shaping the flow of fuel and air emitted from injector 54. Coupling flange 70 extends radially from hood 68 to provide structure for mounting to a combustor, such as at bulkhead 50 in FIG. 2.

Compressed primary air $A_P$ passes into centerbody 60, along air passage surface 84 and into hood 68. Primary air $A_P$ also flows around the outside of annular body 62 and into vanes 72A and 72B. Thus, an axial flow of air from centerbody 60 and a circumferentially swirling flow of air enter hood 68. Fuel nozzle 55 injects fuel between the flows of air to provide a mixed flow of air and fuel for combustion in combustion chamber 36 (FIG. 2). Specifically, fuel from fuel line 76 enters fuel passages 80A and 80B and travels between air passage surface 84 and the exterior of centerbody 60. The fuel exits centerbody 60 at orifices 86A and 86B to intermix with the flows of primary air $A_P$.

Flow of primary air $A_P$ around the exterior of annular body 62 and along surface 84 of centerbody 60 produces friction. The friction heats up the components of fuel injector 54 and the fuel contained therein. As explained, excessive heating of the fuel causes coking, which can clog the passages within fuel injector 54, such as passages 80A and 80B and orifices 86A and 86B. In order to inhibit thermal conduction of heat from primary air $A_P$ to the fuel, voids 66A-66C and voids 82A and 82B are provided within fuel injector 54. Specifically, voids 66A-66C are provided between the outer diameter exterior of annular body 62 and fuel passages 80A and 80B, and voids 82A and 82B are provided between surface 84 of centerbody 60 and fuel passages 80A and 80B.

Voids 66A-66C and voids 82A and 82B are formed integrally with a single fuel injector component. For example, void 66A is completely defined by annular body 62 of fuel nozzle 55. Similarly, void 82A is completely defined by centerbody 60. All of the surfaces of voids 66A and 82A are formed from material made from a single, respective manufacturing process. Thus, voids 66A and 82A are free of any seams or joints between adjacent components. Fuel nozzle 55, including centerbody 60, is a single, integral component made from a single, homogeneous material. Air swirler 56, including annular body 62, vanes 72A and 72B, ring 74, hood 68 and flange 70, is a single, integral component made from a single, homogeneous material. In other words, fuel nozzle 55 and air swirler 56 are each a monolithic structure.

Openings 90A and 90B and openings 92A further manufacturing and performance objectives of voids 82A, 82B and 66A, respectively. Voids 82A and 82B include openings 90A and 90B, respectively, that permit excess material from which centerbody 60 is manufactured to be drained from or taken out of centerbody 60. Likewise, void 66A is provided with opening 92A. Openings for voids 66B and 66C are not shown in the specific cross-section view of FIG. 3. However, voids 66A, 66B and 66C can all form portions of a single, annular void produced within annular body 62, which is interrupted for a fuel passage within fuel stem 64. Likewise, voids 82A and 82B can form portions of a single, annular void produced within centerbody 60. In one embodiment, fuel injector 54 is fabricated from an additive manufacturing process such as direct metal laser sintering (DMLS), which comprises building-up a structure layer-by-layer by selective laser heating of metal powder. In other embodiments, the structure is built-up using an electron beam melting process or some other such additive manufacturing process, as will be discussed in greater detail later. Openings 90A, 90B and 92A allow un-solidified residual metal powder to be removed from voids 82A, 82B and 66A, respectively.

Openings 90A, 90B and 92A are positioned away from the distal ends of voids 82A, 82B and 66A, respectively. This prevents air located in stagnation points at the ends of the component from entering into the void. For example, void 66A includes distal ends 93A and 93B. End 93A is located in the upstream direction, and end 93B is located in the downstream direction. Opening 92A is positioned between ends 93A and 93B such that the furthest axial extents of void 66A include material of cylindrical body 62. Thus, any air that stagnates upstream or downstream of end 93B is prevented from being ingested into void 66A. To further inhibit ingestion, opening 92A is oriented transverse to void 66A. In the embodiment shown, an axis along which opening 92A extends is perpendicular to an axis along which void 66A extends. Such an orientation produces a circuitous flow path with a tight turning radius that is difficult for high velocity primary air $A_P$ traveling over cylindrical body 62 to execute.

FIGS. 4A-7 show another embodiment of a fuel injector in which hollow-wall heat shielding is used within a centerbody that forms an integrated fuel manifold. The manufacturing processes of fuel injector components of the present invention are described in further detail with reference to the embodiment of FIGS. 4A-7.

Figure 4B:
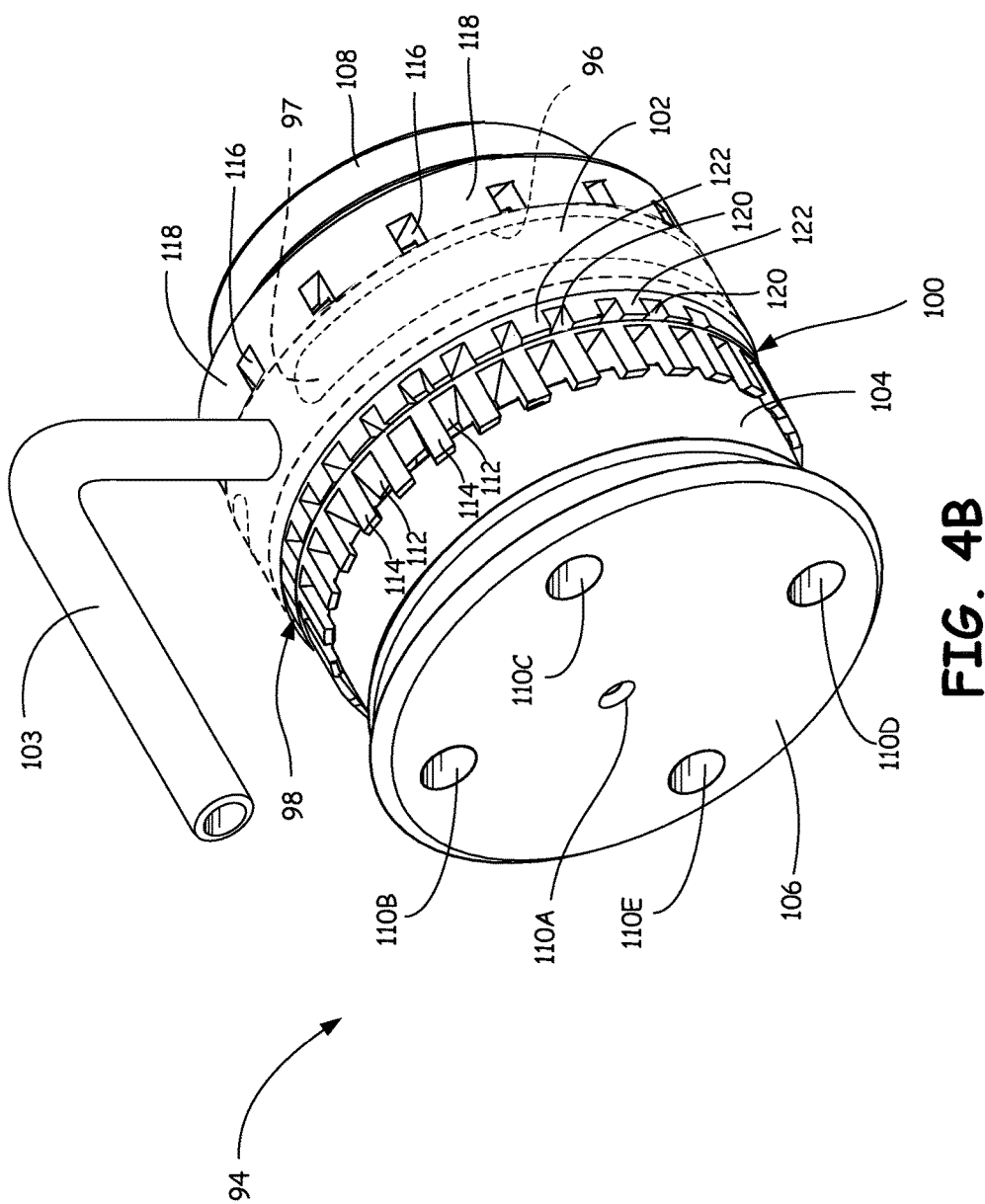
FIG. 4B is a perspective view of a fuel injector centerbody having an integral fuel manifold and radial air swirler that utilizes hollow-wall heat shielding.
Figure 5B:
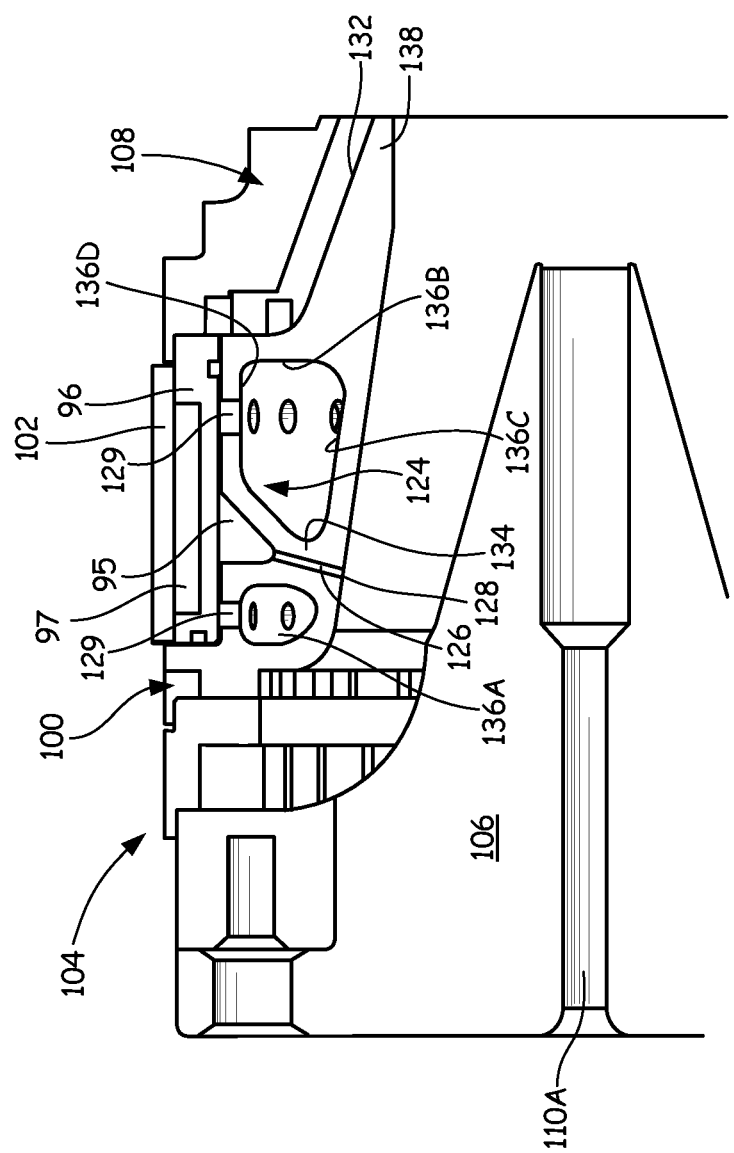
FIG. 5B is a partial cross-sectional view of the fuel injector centerbody of FIG. 4B showing a fuel passage extending across the hollow-wall void, and a fuel orifice positioned in the air flow surface.

FIG. 4A is an exploded view of fuel injector 94 having integral fuel manifold 95 (see FIG. 5A) located inward of insulation ring 96, which is surrounded by cover ring 102 to form air space 97 (see also FIG. 5B). FIG. 4B is a perspective view of fuel injector 94 of FIG. 4A and is discussed concurrently with FIG. 4A. Fuel stem 103 extends through cover ring 102 and insulation ring 96 to link to fuel manifold 95. Fuel injector 94 also includes air swirler 98 of centerbody 100, forward swirler 104, air injector 106 and aft swirler 108.

Air injector 106 includes bores 110A-110E, which permit axial flow of air into injector 94. Forward swirler 104 includes openings 112 and vanes 114, which permit a radial flow of air into injector 94 with a circumferential swirling vector component.

Likewise, aft swirler 108 includes openings 116 and vanes 118, which permit a radial flow of air into injector 94 with a circumferential swirling component. Forward and aft swirlers 104 and 108 provide vortices of air between which fuel is injected from centerbody 100. Centerbody 100 connects to fuel stem 103 to receive a flow of liquid fuel, which is dispersed into fuel manifold 95 (FIG. 5A) within cover ring 102 and insulation ring 96. Air swirler 98 of centerbody 100 also includes openings 120 and vanes 122, which permit a radial flow of air into injector 94 with a circumferential swirling component. Centerbody 100 includes hollow-wall insulation to prevent heat from frictional heating of air flowing across centerbody 100 from spreading to manifold 95, as shown in FIGS. 5A and 5B.

FIG. 5A is a partial cross-sectional view of fuel injector centerbody 100 of FIG. 4B showing hollow-wall void 124 between fuel manifold 95 and interior surface 125. FIG. 5B is a partial cross-sectional view of fuel injector centerbody 100 of FIG. 4B showing fuel passage 126 extending across hollow-wall void 124, and fuel orifice 128 positioned in airflow surface 125. Fuel manifold 95 includes ports 129 that extend through to exterior surface 130. FIGS. 5A and 5B are discussed concurrently.

Centerbody 100 is positioned axially between forward swirler 104 and aft swirler 108. Centerbody 100 comprises a generally annular body from which air swirler 98 extends radially outward at a leading edge of centerbody 100, while cone 138 extends axially from a trailing edge of centerbody 100. Air injector 106 is coupled to forward swirler 104. Insulation ring 96 is positioned concentrically around centerbody 100 to cover mainifold 95. Cover ring 102 is positioned concentrically around insulation ring 96 to form air space 97 (FIG. 5B). Fuel stem 103 extends through cover ring 102, air space 97 and insulation ring 96 to fluidly connect to manifold 95.

Air flows axially into interior surface 125 of centerbody 100, such as from bore 110A. A radial flow of air enters into forward swirler 104 through openings 112, and vanes 114 produce a swirling flow of air that rotates circumferentially as it travels across interior surface 125. Similarly, a radial flow of air enters into aft swirler 108 through openings 116, and vanes 118 produce a swirling flow of air that rotates circumferentially as it travels across surface 132 of centerbody 100. Fuel from fuel stem 103 flows into manifold 95 and passes through fuel passage 126 (FIG. 5B), which extends through pedestal 134. Pedestal 134 extends through hollow-wall void 124 to connect manifold 95 to interior surface 125. Fuel from passage 126 exits centerbody 100 at orifice 128 and passes to the interior of the annulus formed by interior surface 125. As such, fuel is mixed with air within the annulus of centerbody 100 for subsequent combustion within combustor section 18 (FIG. 1).

In order to prevent frictional heat from air flowing around fuel injector 94 from reaching fuel manifold 95, centerbody 100 is provided with hollow-wall void 124, and insulation ring 96 is provided with air space 97. Air space 97 formed between insulation ring 96 and cover ring 102 inhibits heat from the outer diameter surfaces of injector 94 from reaching manifold 95. Likewise, hollow-wall void 124 inhibits heat from interior surface 125 from reaching manifold 95.

In the embodiment shown, hollow-wall void 124 has a quadrilateral shape defined by leading edge (LE) wall 136A, trailing edge (TE) wall 136B, inner wall 136C and outer wall 136D. Specifically, hollow-wall void 124 has a trapezoidal shape, with walls 136A and 136B generally being parallel. However, hollow-wall void 124 may have other shapes that are oblong, such as oval or rectangular. For example, hollow-wall void 124 may be configured as two-semi circular ends connected by straight-line side segments, such as void 66A of FIG. 3. Hollow-wall void 124 has a generally oblong shape that is elongated in the direction of flow of air from LE wall 136A and TE wall 136B. Hollow-wall void 124 need not extend axially in a straight line.

Ports 129 facilitate removal of material from within hollow-wall void 124 remaining after centerbody 100 is produced. In the depicted embodiment, ports 129 are arranged in two circumferential arrays of ports that are axially spaced from each other. Each circumferential array of ports 29 includes a number of ports such that approximately half of the circumference of centerbody 100 is defined by ports. Such a number of ports 129 is permitted due to the fact that centerbody 100 is capped or covered by insulation ring 96 after the un-solidified powder is removed. A large number of ports facilitates rapid removal of un-solidified powder. However, in other embodiments, such as the embodiment of FIG. 3, a fewer number of ports can be used. As will be discussed later, the placement and orientation of ports 129 improves insulating performance of hollow-wall void 124.

Hollow-wall void 124 and ports 129 are formed integrally into centerbody 100 at the time of fabrication. Centerbody 100 comprises a monolithic structure that is void of any seam lines or joints from manufacturing. As such, centerbody 100 does not include structural weaknesses that reduce the insulating effectiveness of hollow-wall void 124. Centerbody 100 is fabricated using one of a plurality of additive manufacturing processes that are known in the art. For example, Selective Laser Sintering (SLS), three-dimensional (3D) laser printing, 3D inkjet printing, Sterolithography (SLS), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD) and Direct Metal Laser Sintering (DMLS) may be used to fabricate centerbody 100. A variety of systems are commercially available for carrying out such processes.

In one embodiment, a DMLS manufacturing process is used in which centerbody 100 is built-up in a plurality of layers or slices defined by STL files derived from CAD drawings. Specifically, a layer of a powdered metal, such as a titanium or nickel base alloy, is layered across a substrate and a laser is used to selectively solidify portions of the powder layer based on an STL file for that layer. Subsequently, an additional layer of powdered metal is layered over the previously selectively solidified layer and is also selectively solidified with the laser based on the next STL file in the sequence of files. The process is repeated a plurality of times, adding layers of approximately about 0.0005 inches (~0.0127 mm) to about 0.001 inches (~0.0254) thick to the structure that is being formed. As such, solidified metal can be formed over powdered metal in order to fabricate an internal void or space. It then, however, becomes necessary to remove the powdered metal that remains within the internal void or space after the component is finished being fabricated. In the present invention, a fuel injector component is manufactured having an internal void or space that is connected to the outside of the component by a plurality of leech holes or ports.

Centerbody 100 includes ports 129 that permit un-solidified powder used to fabricate centerbody 100 to be removed from hollow-wall void 124. Ports 129 are integrally formed during manufacturing to eliminate thermal weaknesses in hollow-wall void 124. Ports 129 are positioned away from the distal or axial ends of hollow-wall void 124. Specifically, ports 129 are in between LE wall 136A and TE wall 136B (FIG. 5B). Portions of centerbody 100 defining LE wall 136A and TE wall 136B are not interrupted by ports 129. Thus, ports 129 are located away from stagnation points of air flowing over centerbody 100. Furthermore, ports 129 are oriented generally transverse to the oblong orientation of hollow-wall void 124. Specifically, a radial axis along which each of ports 129 extends is perpendicular to a line extending axially between LE wall 136A and TE wall 136B. Thus, access to hollow-wall void 124 through ports 129 requires an abrupt change in direction of the air flowing over centerbody 100, which limits entry of hot gas into hollow-wall void 124. However, in the embodiment of FIGS. 5A and 5B, ports 129 are additionally sealed-up by insulation ring 96 to close manifold 95, which also prevents ingestion of hot air into hollow-wall void 124.

Figure 6:
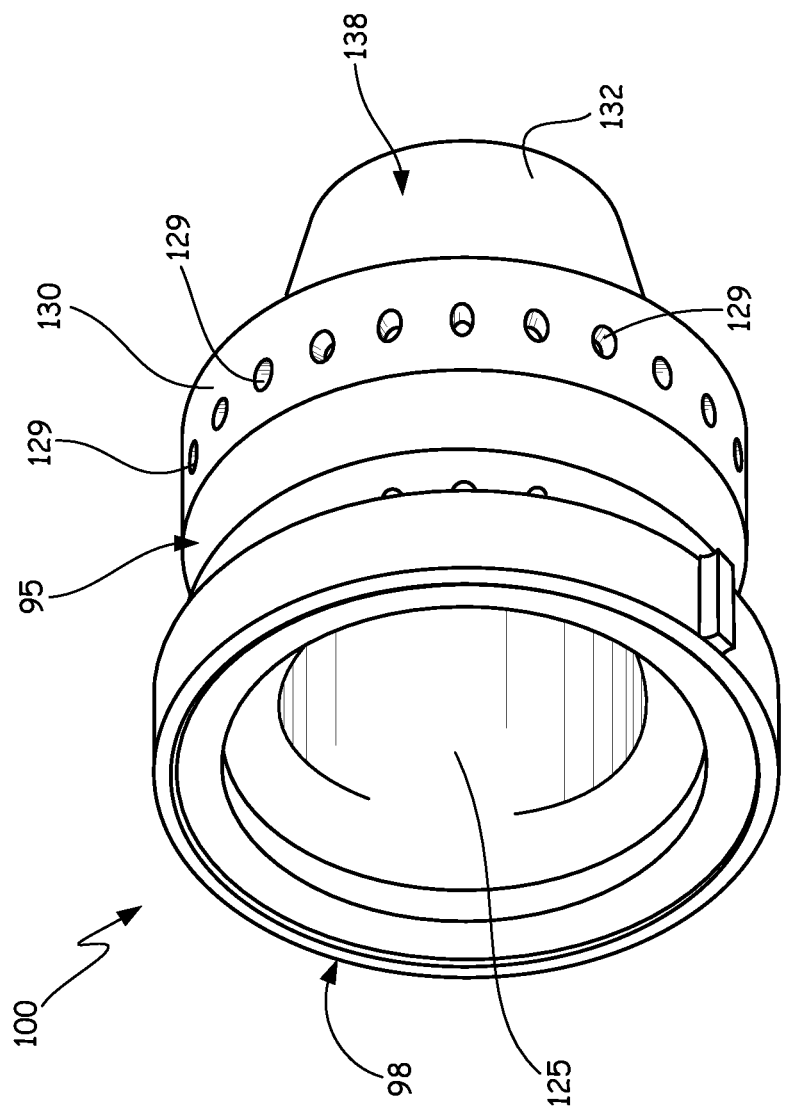
FIG. 6 is a perspective view of the fuel injector centerbody of FIGS. 4A-5B shown in an as-fabricated state before machining

FIG. 6 is a perspective view of fuel injector centerbody 100 of FIGS. 4A-5B shown in an as-fabricated state, before machining. As discussed above, centerbody 100 comprises an annular body defining airflow surface 125 and exterior surfaces 130 and 132. A leading edge of centerbody 100 includes air swirler 98, while a trailing edge of centerbody 100 defines cone 138. Fuel manifold 95 extends into exterior surface 130 and comprises a generally triangular trough in the depicted embodiment. However, fuel manifold 95 may have other cross-sectional geometries than triangular to distribute fuel around the circumference of centerbody 100. Fuel manifold 95 extends over the entire circumference of centerbody 100 forming a three-hundred-sixty-degree channel.

Centerbody 100 is depicted in FIG. 6 after being initially produced by an additive manufacturing process. Immediately after manufacturing, centerbody 100 includes powdered metal within hollow-walled void 124 (FIGS. 5A and 5B). To remove the powdered metal, centerbody 100 is shaken or vibrated to facilitate removal of the powdered material. Vibrating or shaking of centerbody 100 facilitates loosening of powder that may be caked within centerbody 100. Further, the vibrating or shaking assists the powder in leaving centerbody 100 through ports 129. In addition to vibrating and shaking, compressed or pressurized air or gas may be applied to centerbody 100 to facilitate removal of the powder material. Specifically, the air or gas may be directed into one or more of ports 129 to directly blow-out or carry-away the powdered material.

Figure 7:
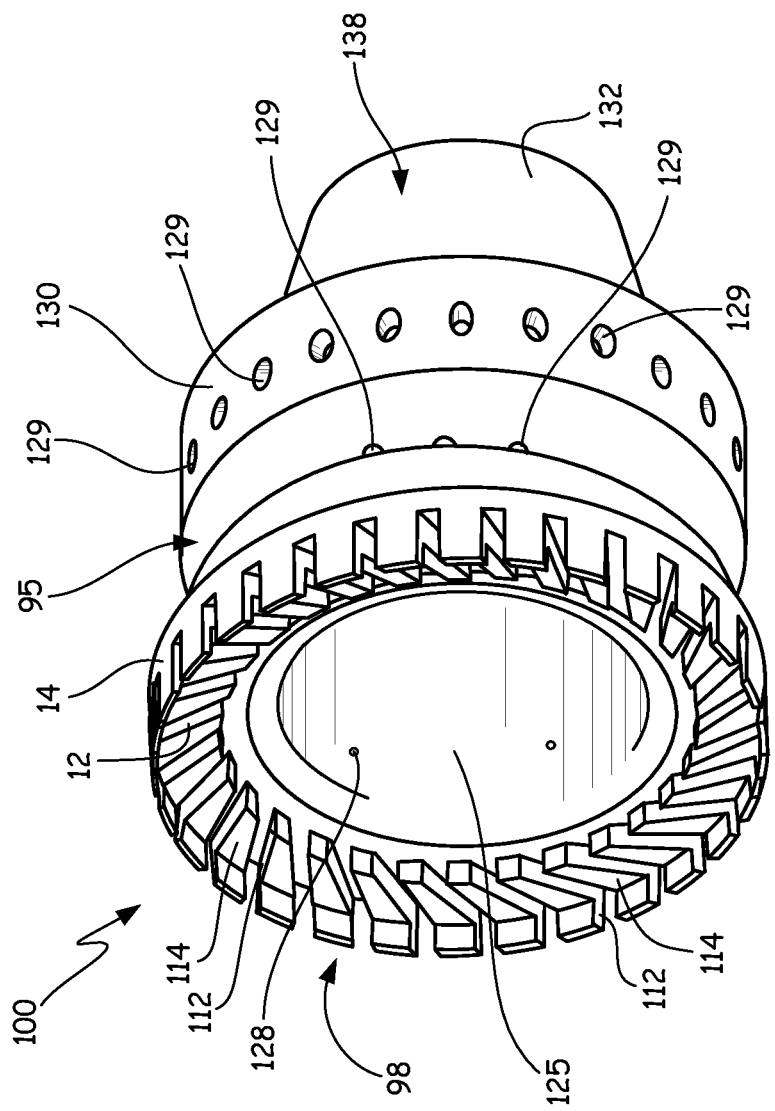
FIG. 7 is a perspective view of the fuel injector centerbody of FIG. 6 after machining, as shown in FIGS. 4A-5B.

As mentioned, centerbody 100 is shown in FIG. 6 prior to any subsequent machining process that are used to remove material from the as-produced component. Specifically, air swirler 98 does not yet include opening 112 or vanes 114, as are shown in FIGS. 4 and 7. Additionally, exterior surface 130 may include a surface smoothness that is too rough or porous after manufacturing. Further, manifold 95 may include rough or rounded edges that do not facilitate tight or flush engagement with insulation ring 96. Thus, even though centerbody 100 is fabricated as a monolithic component in which hollow-wall void 124 (FIGS. 5A and 5B) is integrally formed, subsequent machining (i.e. subtractive manufacturing) processes can be used to finish centerbody 100.

FIG. 7 is a perspective view of fuel injector centerbody 100 of FIG. 6 after machining, as is shown in FIGS. 4A-5B. Specifically, exterior surface 130 is machined to remove material so that surface 130 is smooth to better mate with insulation ring 96. As such, edges between surface 130 and manifold 95 and air swirler 98 are sharpened to mate squarely with insulation ring 96. Additionally, air swirler 98 is machined to remove material and form openings 112, thereby shaping vanes 114. Further, manifold 95 is machined, such as by drilling, to form fuel passages 126 (FIG. 5B) that terminate in airflow surface 125 at orifices 128. Alternatively, fuel passages 126 and orifices 128 can be produced with the additive manufacturing process so as to be included in the as-fabricated component.

Manufactured as such, centerbody 100 comprises a monolithic structure including hollow-wall void 124 (FIGS. 5A and 5B), which is only accessible through ports 129. The monolithic nature of centerbody 100 eliminates thermal weaknesses along hollow-wall void 124 that may diminish insulating capacity. Ports 129 are positioned so as to not interfere with the functionality of hollow-wall void 124. Specifically, ports 129 intersect hollow-wall void 124 transversely. Additionally, ports 129 are located away from axial ends of hollow-wall void 124. Configured as such, ports 129 limit the ability of hot air to enter directly into hollow-wall void 124 through ports 129.

The following are non-exclusive descriptions of possible embodiments of the present invention.

A fuel injector component comprising a body having: a first surface, and a second surface; an elongate void enclosed by the body, the void being integrally formed between portions of the body defining the first surface and the second surface; and a bore extending into the second surface to intersect the elongate void.

The fuel injector component of the preceding paragraph can optionally include, additionally and/or alternatively, any one or more of the following features, configurations and/or additional components:

A body including a plurality of bores extending into the second surface to intersect the elongate void.

An elongate void includes first and second distal ends, and the plurality of bores are spaced from the first and second distal ends.

Each of the plurality of bores extends transverse to the elongate void.

A first surface configured to engage a fuel flow, a second surface configured to engage an air flow, and an elongate void that extends from the first distal end to the second distal end in a direction in which the air flow is configured to flow.

An elongate void that produces dead-air space in the body that spaces portions of the first surface from portions of the second surface.

A body that is a monolithic structure.

A body that is fabricated using a rapid manufacturing process.

A body comprising an annular structure including an outer-facing surface comprising the first surface, and an inner-facing surface comprising the second surface.

A plurality of bores that are arranged in a circumferential array about the outer facing surface.

A circumferential indentation in the outer facing surface adjacent the elongate void, multiple pedestals extending from the circumferential indentation within the elongate void to connect to a portion of the body forming the inner facing surface, and a plurality of fuel passages extending through the multiple pedestals, respectively, to connect the outer facing surface to the inner facing surface.

A cover coupled to the body adjacent the outer facing surface to form a manifold within the circumferential indentation and to seal the circumferential array of bores.

A plurality of swirl vanes extending from the first or second surface.

A process for making a fuel injector component for use in a gas turbine engine comprises building an injector component body using an additive manufacturing process that utilizes a powdered building material, the injector component body comprising: a first surface configured to be in thermal communication with a fuel flow; a second surface configured to be in thermal communication with an air flow; a void substantially enclosed by the body, the void being formed by portions of the body defining the first surface and the second surface; and a plurality of ports extending into the second surface to intersect the void; and removing residual powdered building material from the void through the plurality of ports.

The process for making a fuel injector component for use in a gas turbine engine of the preceding paragraph can optionally include, additionally and/or alternatively, any one or more of the following features, steps, configurations and/or additional components:

Vibrating the injector component body to facilitate removal of the residual powdered building material within the void.

Directing a flow of compressed air into the void to facilitate removal of the residual powdered building material.

Machining the injector component body to remove material.

Smoothing a surface of the body.

Shaping a plurality of swirl vanes in a surface of the body.

Forming a trench in the first surface to form a fuel manifold, forming pedestals extending from the trench within the void to connect to a portion of the injector component body forming the second surface, and forming passages in the pedestals to link the first surface with the second surface.

Joining a cover to the injector component body to close-off the plurality of ports.

Joining a cover to the injector component body to seal the fuel manifold.

A void that is elongate and comprises first and second distal ends.

A plurality of ports that are spaced from the first and second distal ends.

Ports that extend transverse to the elongate void.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel injector component comprising:
a monolithic body comprising an annular structure including:
an outer-facing surface; and
an inner-facing surface;
an elongate void enclosed by the monolithic body, the elongate void being integrally formed between portions of the monolithic body defining the outer-facing surface and the inner-facing surface;
a plurality of ports extending into the outer-facing surface to intersect the elongate void, wherein each of the plurality of ports extends transversely to an elongated direction of the elongate void, and wherein the plurality of ports are arranged in a circumferential array about the outer-facing surface;
a circumferential indentation in the outer-facing surface adjacent the elongate void;
multiple pedestals extending from the circumferential indentation within the elongate void to connect to a portion of the monolithic body forming the inner-facing surface; and
a plurality of fuel passages extending through the multiple pedestals, respectively, to connect the outer-facing surface to the inner-facing surface.

2. The fuel injector component of claim 1, wherein:
the elongate void includes first and second distal ends; and
the plurality of ports are spaced from the first and second distal ends.

3. The fuel injector component of claim 2, wherein:
the outer-facing surface is configured to engage a fuel flow;
the inner-facing surface is configured to engage an air flow; and
the elongate void extends from the first distal end to the second distal end in a direction in which the air flow is configured to flow.

4. The fuel injector component of claim 1, wherein the elongate void produces dead-air space in the monolithic body that spaces portions of the outer-facing surface from portions of the inner-facing surface.

5. The fuel injector component of claim 1, wherein the monolithic body is fabricated using an additive manufacturing process.

6. The fuel injector component of claim 1, and further comprising:
a cover coupled to the monolithic body adjacent the outer-facing surface to form a manifold within the circumferential indentation and to seal the circumferential array of ports.

7. The fuel injector component of claim 1, and further comprising:
a plurality of swirl vanes extending from the outer-facing or the inner-facing surface.

8. A process for making a fuel injector component for use in a gas turbine engine, the process comprising:
building a monolithic body of the injector component using an additive manufacturing process that utilizes a powdered building material, the monolithic body comprising:
an annular structure including:
an outer-facing surface configured to be in thermal communication with a fuel flow; and
an inner-facing surface configured to be in thermal communication with an air flow;
an elongate void enclosed by the monolithic body, the elongate void being integrally formed between portions of the monolithic body defining the outer-facing surface and the inner-facing surface; and
a plurality of ports extending into the outer-facing surface to intersect the elongate void, wherein each of the plurality of ports extends transversely to an elongated direction of the elongate void, and wherein the plurality of ports are arranged in a circumferential array about the outer-facing surface;
removing residual powdered building material from the elongate void through at least one of the plurality of ports;
forming a circumferential indentation in the outer-facing surface adjacent the elongate void to form a fuel manifold;
forming multiple pedestals extending from the circumferential indentation within the elongate void to connect to a portion of the monolithic body forming the inner-facing surface; and
forming a plurality of fuel passages extending through the multiple pedestals, respectively, to connect the outer-facing surface to the inner-facing surface.

9. The process for making a fuel injector component of claim 8, and further comprising:
vibrating the monolithic body to facilitate removal of the residual powdered building material within the elongate void.

10. The process for making a fuel injector component of claim 8, and further comprising:
directing a flow of compressed air into the elongate void to facilitate removal of the residual powdered building material.

11. The process for making a fuel injector component of claim 8, and further comprising:
machining the monolithic body to remove material.

12. The process for making a fuel injector component of claim 11, wherein machining the monolithic body further comprises:
smoothing a surface of the monolithic body.

13. The process for making a fuel injector component of claim 11, wherein machining the monolithic body further comprises:
shaping a plurality of swirl vanes in a surface of the monolithic body.

14. The process for making a fuel injector component of claim 8, and further comprising:
joining a cover to the monolithic body to close-off the plurality of ports.

15. The process for making a fuel injector component of claim 8, and further comprising:
joining a cover to the monolithic body to seal the fuel manifold.

16. The process for making a fuel injector component of claim 8 wherein:
the void comprises first and second distal ends; and the plurality of ports are spaced from the first and second distal ends.

17. A fuel injector made by the process of claim 8.

18. The fuel injector component of claim 1, wherein the elongate void is accessible only through the plurality of ports.

* * * * *

UNITED STATES PATENT AND TRADEMARK OFFICE
CERTIFICATE OF CORRECTION

| | | |
|---|---|---|
| PATENT NO. | : 9,920,693 B2 | |
| APPLICATION NO. | : 14/769386 | |
| DATED | : March 20, 2018 | |
| INVENTOR(S) | : Russell B. Hanson | |

It is certified that error appears in the above-identified patent and that said Letters Patent is hereby corrected as shown below:

In the Specification

Column 1, Line 34:
Delete "bum"
Insert --burn--

Signed and Sealed this
Twenty-ninth Day of May, 2018

Andrei Iancu
*Director of the United States Patent and Trademark Office*